United States Patent
D R et al.

(10) Patent No.: US 12,481,508 B2
(45) Date of Patent: Nov. 25, 2025

(54) PROCESSOR ENVIRONMENT AGNOSTIC BASIC INPUT OUTPUT SYSTEM TIMING CONFIGURATION MANAGEMENT

(71) Applicant: Dell Products L.P., Round Rock, TX (US)

(72) Inventors: Thippeswamy D R, Tumkur (IN); Shekar Babu Suryanarayana, Bangalore (IN); Niyathi Shenoy K, Kasaragod (IN)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/424,629

(22) Filed: Jan. 26, 2024

(65) Prior Publication Data
US 2025/0245017 A1   Jul. 31, 2025

(51) Int. Cl.
*G06F 9/00* (2018.01)
*G06F 9/4401* (2018.01)

(52) U.S. Cl.
CPC .......... *G06F 9/4405* (2013.01); *G06F 9/4401* (2013.01)

(58) Field of Classification Search
CPC .................................................. G06F 9/4401
USPC .................................................. 713/2
See application file for complete search history.

(56) References Cited

U.S. PATENT DOCUMENTS

| | | | | |
|---|---|---|---|---|
| 7,065,688 B1* | 6/2006 | Moyes | ............... | G06F 9/4405 714/25 |
| 7,188,261 B1* | 3/2007 | Tobias | ............... | G06F 1/3203 713/1 |
| 7,454,547 B1* | 11/2008 | Nallagatla | ............ | G06F 9/4812 712/E9.082 |
| 7,882,345 B1* | 2/2011 | Christensen | ......... | G06F 9/4416 713/1 |
| 2004/0205779 A1* | 10/2004 | Almeida | ................ | H04L 67/34 719/321 |
| 2004/0221147 A1* | 11/2004 | Tseng | ........................ | G06F 8/65 713/1 |
| 2004/0236936 A1* | 11/2004 | Bulusu | .................. | G06F 9/4401 713/2 |
| 2004/0260917 A1* | 12/2004 | Edrich | ............... | G06F 11/2284 713/1 |
| 2005/0223291 A1* | 10/2005 | Zimmer | ............. | G06F 11/1433 714/34 |
| 2006/0015861 A1* | 1/2006 | Takata | .................... | G06F 8/656 717/162 |
| 2010/0169629 A1* | 7/2010 | Zhang | ................. | G06F 9/44505 713/1 |

(Continued)

OTHER PUBLICATIONS

List of Patents or Applications Treated as Related, Feb. 2024.

*Primary Examiner* — Volvick Derose
(74) *Attorney, Agent, or Firm* — Terrile, Cannatti & Chambers, LLP; Stephen A. Terrile

(57) ABSTRACT

A firmware management operation. The firmware management operation includes providing an information handling system with a distributed BIOS, the distributed BIOS including a BIOS component and a BIOS variable; identifying a processor environment installed on an information handling system from a plurality of processor environments; and, tuning a clock within the information handling system based upon the processor environment installed on the information handling system, the tuning being performed during a pre-boot phase of the distributed BIOS.

17 Claims, 9 Drawing Sheets

(56) References Cited

U.S. PATENT DOCUMENTS

| | | | | |
|---|---|---|---|---|
| 2013/0086371 A1* | 4/2013 | Bisht | G06F 9/4403 | |
| | | | 713/2 | |
| 2013/0290778 A1* | 10/2013 | Soderlund | G06F 9/4406 | |
| | | | 714/15 | |
| 2015/0370575 A1* | 12/2015 | Tonry | H04L 9/3268 | |
| | | | 713/2 | |
| 2016/0048436 A1* | 2/2016 | Yamazaki | G06F 9/44505 | |
| | | | 713/2 | |
| 2016/0188868 A1* | 6/2016 | Otturu | G06F 21/44 | |
| | | | 713/1 | |
| 2016/0231804 A1* | 8/2016 | Bulusu | G06F 1/3234 | |
| 2017/0315921 A1* | 11/2017 | Hooker | G06F 12/123 | |
| 2018/0004502 A1* | 1/2018 | Samuel | G06F 9/4401 | |
| 2018/0107538 A1* | 4/2018 | Grabowski | G11C 7/00 | |
| 2018/0136928 A1* | 5/2018 | Downum | G06F 8/654 | |

\* cited by examiner

PROCESSOR ENVIRONMENT AGNOSTIC BASIC INPUT OUTPUT SYSTEM TIMING CONFIGURATION MANAGEMENT

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: providing an information handling system with a distributed BIOS, the distributed BIOS including a BIOS component and a BIOS variable; identifying a processor environment installed on an information handling system from a plurality of processor environments; and, tuning a clock within the information handling system based upon the processor environment installed on the information handling system, the tuning being performed during a pre-boot phase of the distributed BIOS.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing an information handling system with a distributed BIOS, the distributed BIOS including a BIOS component and a BIOS variable; identifying a processor environment installed on an information handling system from a plurality of processor environments; and, tuning a clock within the information handling system based upon the processor environment installed on the information handling system, the tuning being performed during a pre-boot phase of the distributed BIOS.

In another embodiment the invention relates to a computer-readable storage medium embodying computer program code, the computer program code comprising computer executable instructions configured for: providing an information handling system with a distributed BIOS, the distributed BIOS including a BIOS component and a BIOS variable; identifying a processor environment installed on an information handling system from a plurality of processor environments; and, tuning a clock within the information handling system based upon the processor environment installed on the information handling system, the tuning being performed during a pre-boot phase of the distributed BIOS.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
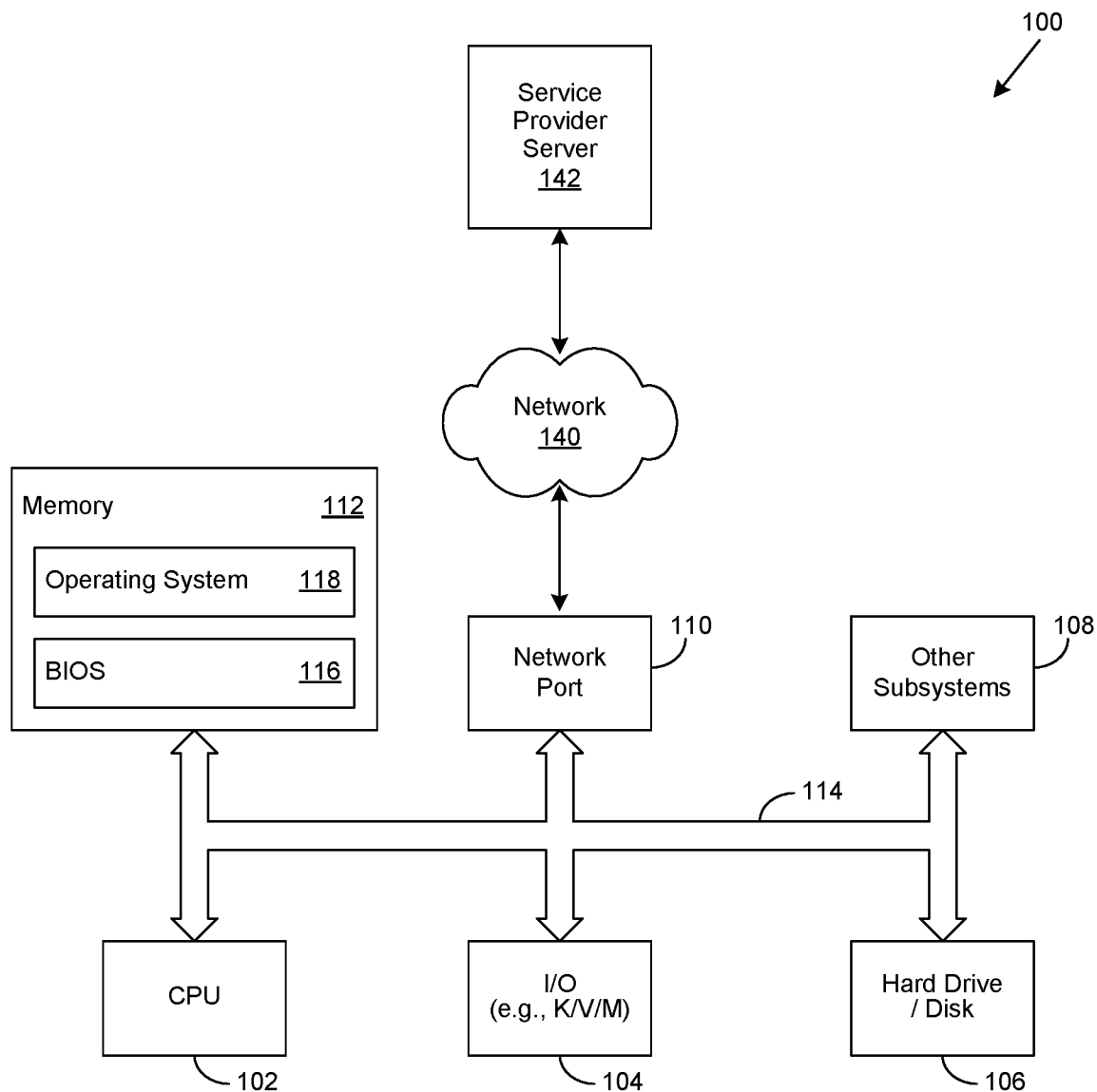
FIG. 1 shows a general illustration of components of an information handling system as implemented in the system and method of the present invention.

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the invention reflect an appreciation that BIOS firmware typically includes a combination of BIOS components, or BIOS variables, or both, as described in greater detail herein. Likewise, various aspects of the invention reflect an appreciation that certain of these BIOS components may be specific to a particular processor environment (PE), likewise described in greater detail herein, while others may be related to a particular aspect of an associated architecture-specific distributed firmware management platform. For example, BIOS components that are not specific to a particular PE may instead be related to other platform components, such as system memory, mass storage, audio and video peripherals, security mechanisms, network communication interfaces, and so forth. Various embodiments of the invention likewise reflect an appreciation that PE-related and other platform BIOS components are typically tightly coupled. However, while such BIOS components may be tightly coupled, they may be used, separately or individually, in the Pre Extensible Firmware Interface (EFI) Initialization (PEI) phase and the Driver execution Environment (DXE) phase of the pre-boot phases.

Furthermore, certain PE BIOS components in various embodiments may be stored within one memory type, while other platform BIOS components may be stored in another. As an example, PE BIOS components may be stored within a SPI Flash memory, while other platform BIOS components may be stored within a BP associated with NVMe memory. Accordingly, various embodiments of the invention reflect an appreciation that such decoupling of PE BIOS components from other platform BIOS components 526 may present certain programmatic and operational challenges.

Various aspects of the present invention include an appreciation that BIOS firmware can perform timing configuration management operations for an associated information handling system. Various aspects of the present disclosure include an appreciation that timing configuration management operations can be used to configure a system timing circuit of an associated information handling system. Various aspects of the present disclosure include an appreciation that the system timing circuit can include a phase-locked loop (PLL) type system timing circuit. Likewise, various aspects of the present disclosure include an appreciation that a PPL type system timing circuit can be used by the associated information handling system to produce stable and synchronized timing signals (often referred to as clock signals). Likewise, various aspects of the present disclosure include an appreciation that a PPL type system timing circuit can function as a frequency synthesizer, a clock multiplier, a phase synchronizer, an input/output interface clock generation, external system clock control, jitter management, or a combination thereof.

Various aspects of the present invention include an appreciation that PLL type system timing circuits are important to information handling systems by providing stable clock signals to system components, including processor environments, memory devices, and peripheral modules (i.e., using the clock signal to provide a clocking function). Various aspects of the present invention include an appreciation that PLL type system timing circuit can also facilitate accurate data sampling. Likewise, various aspects of the present disclosure include an appreciation that any minor deviation in the operation of the PLL type system timing circuit can disrupt the entire information handling system operation, potentially resulting in a suboptimal user experience.

Various aspects of the present invention include an appreciation that timing attributes of different processor environments can differ due to variations in processor environment architecture, processor operating frequencies, or a combination thereof. Likewise, various aspects of the present disclosure include an appreciation that it would be desirable for an information handling system equipped with any of a plurality of processor environments should exhibit consistent response times across processor, memory, and peripheral operations.

Various aspects of the present invention include an appreciation that without proper tuning of PLL type system timing circuit attributes, power and thermal values can exhibit variations, which may or may not be acceptable. Likewise, various aspects of the present disclosure include an appreciation that exceeding an acceptable variation range can result in a change in system behavior, which can lead to an undesirable customer experience. Likewise, various aspects of the present disclosure include an appreciation that battery consumption may be correlated with PLL type system timing circuit tuning across processor environments, processors, graphics processing units, network devices, storage channels, or a combination thereof. If the PLL type system timing circuit is not synchronized with the hardware subsystems within an operating system policy domain, it can lead to unnecessary battery and AC power consumption.

Various aspects of the present invention include an appreciation that exchanging memory modules such as dual in-line memory modules (DIMMs) or small outline DIMMs (SoDIMMs) with different configurations, whether higher or lower, can often require dynamic PLL signal tuning. Various aspects of the present invention include an appreciation that while silicon vendors may have performed some version of tuning, it is not calibrated to the platform ecosystem, including specific platform original design manufacturer configurations and common hardware interfaces. Likewise, various aspects of the present disclosure include an appreciation that exchanging peripheral devices without synchronization with the processor or memory modules timing signals can lead to performance issues, slowdowns, hangs, or system resets. Likewise, various aspects of the present disclosure include an appreciation that interrupt response service response (i.e., latency) can also be impacted when PLL signal tuning is not performed.

A system and method are disclosed for performing a basic input output system timing configuration management operation. In certain embodiments, a distributed basic input output system performs the basic input output system timing configuration management operation. In certain embodiments, the basic input output system timing configuration management operation includes a timing circuit tuning operation. In certain embodiments, the timing circuit tuning operation includes a firmware tuned PLL configuration protocol (FTPCP). In certain embodiments, the timing circuit tuning operation tunes timing attributes with respect to processor environment data. In certain embodiments, the timing circuit tuning operation tunes a system clock signal, a memory clock signal, or a combination thereof.

In certain embodiments, the basic input output system timing configuration management operation includes a service routine tuning operation. In certain embodiments, the service routine tuning operation tunes an interrupt service routine (IRQ). In certain embodiments, the service routine tuning operation tunes the interrupt service routing for varied timing attributes thereby avoiding latency in interrupt services.

In certain embodiments, the basic input output system timing configuration management operation includes a timing configuration variable fetching operation. In certain embodiments, the timing configuration variable fetching operation retrieves timing configuration variables from a predefined storage location. In certain embodiments, the predefined storage location includes a cloud based storage location. In certain embodiments, the timing configuration variable fetching operation facilitates dynamic tuning of timing configurations of the timing circuit when exchanging of system components such as memory modules and PLL configurations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then be used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably.

In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100.

In certain embodiments, the firmware management operation may be performed during operation of an IHS 100. In various embodiments, performance of the firmware management operation may result in the realization of improved operation of an IHS 100.

Figure 2:
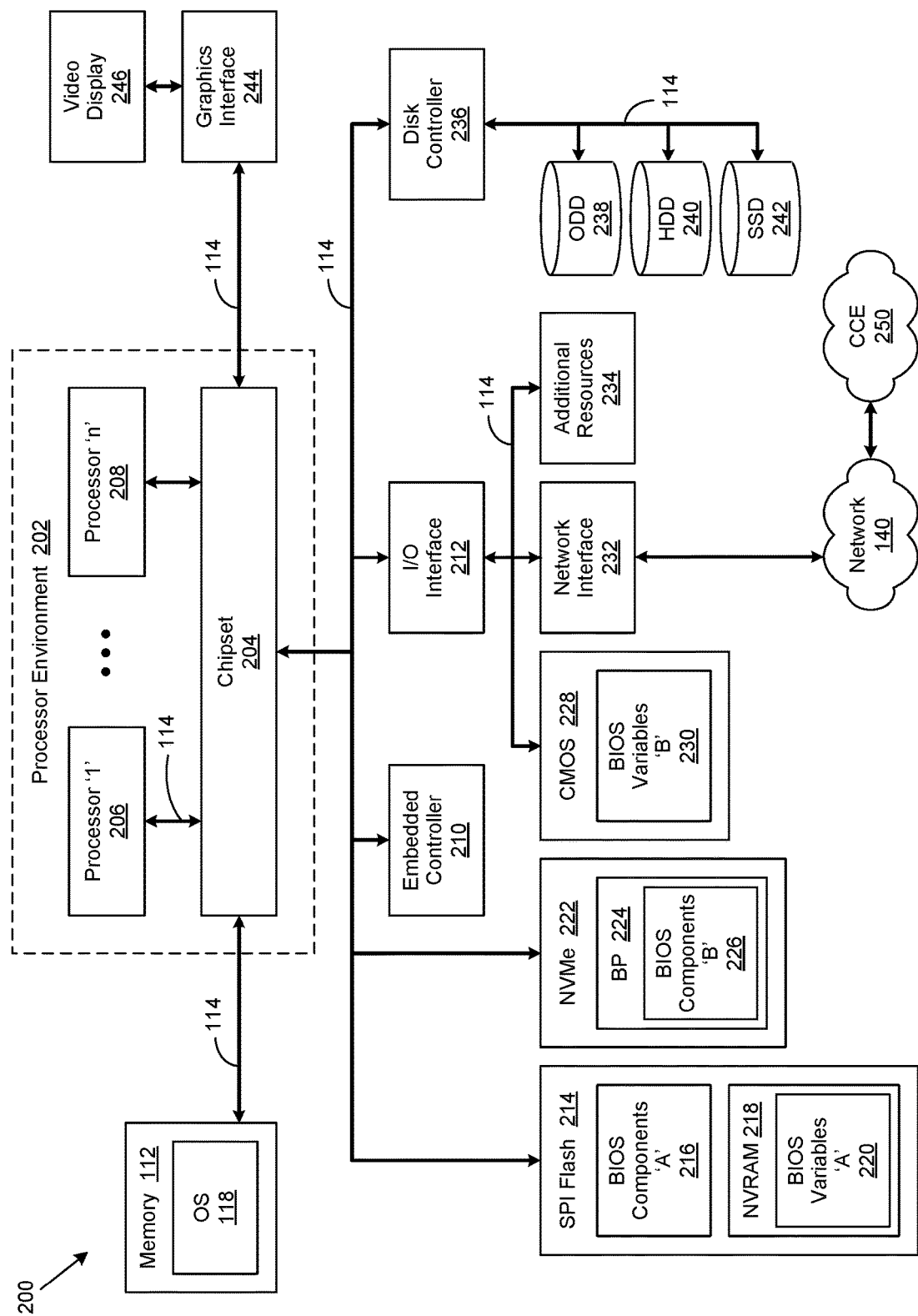
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208.

As an example, processors '1' 206 through 'n' 208 of a particular PE 202 may be implemented to be the same in a server. In this example, each processor may be assigned to be a resource to one or more virtual machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1' 206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®.

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234. or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction.

In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors '1' 206 through 'n' 208, the EC 210, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components 'A' 216 or 'B' 226, or one or more BIOS variables 'A' 220 or 'B' 230, or a combination thereof. In various embodiments, one or more BIOS components 'A' 216 or 'B' 226, or one or more BIOS variables 'A' 220 or 'B' 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components 'A' 216 or 'B' 226, or one or more BIOS variables 'A' 220 or 'B' 230, or a combination thereof, from each other. In various embodiments, the performance of the distributed firmware management operation effectively decouples PE BIOS components from other platform BIOS components, as described herein.

In various embodiments, individual BIOS components 'A' 216 or 'B' 226 used in the performance of one or more distributed firmware management operations may be located within, or outside of, the multi-processor operating environment 200. As an example, a particular BIOS component 'A' 216 or 'B' 226 may initially be stored within a cloud computing environment (CCE) 250, described in greater detail herein. In this example, the firmware component may be retrieved from the CCE 250 by the multi-processor operating environment 200 and then respectively stored as firmware components 'A' 216 in NVRAM 218, or 'B' 226 in NVMe 222 memory, or a combination of the two.

Figure 3:
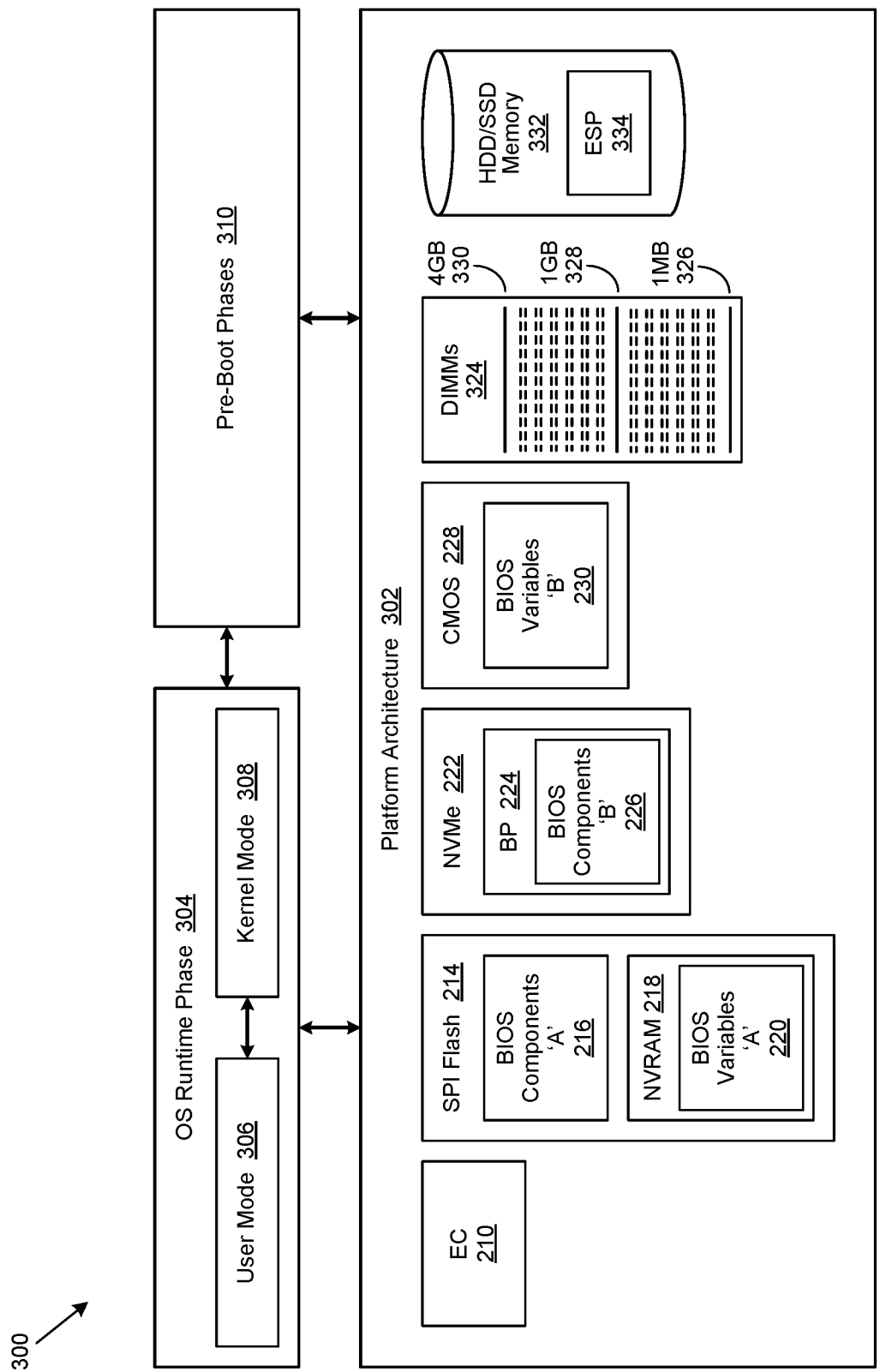
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS's may utilize different processors (e.g., Intel®, AMD®, Qualcom®, Broadcom®, Nvidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, Serial Peripheral Interface (SPI) Flash 214 memory, Non-volatile Memory Express (NVMe) 222 memory, and a complementary metal-oxide-semiconductor (CMOS) 228 chip, or a combination thereof, as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more BIOS components 'A' 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables 'A' 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226. In various embodiments, as likewise described in greater detail herein, the CMOS 228 chip may be implemented to receive, store, and provide access to, one or more BIOS variables 'B' 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
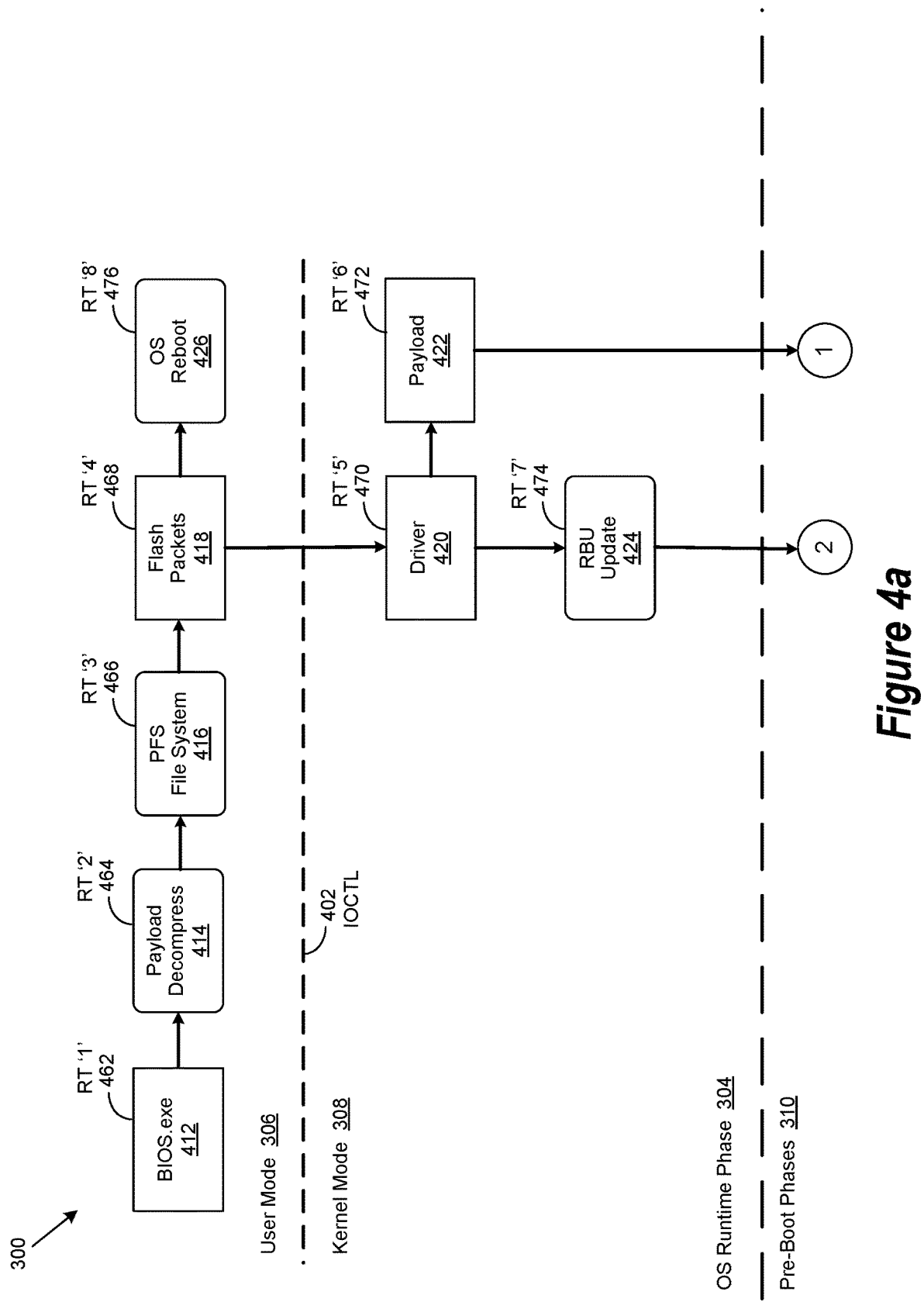
FIGS. 4a through 4c are a simplified block diagram showing the performance of certain distributed firmware management operations.
Figure 4B:
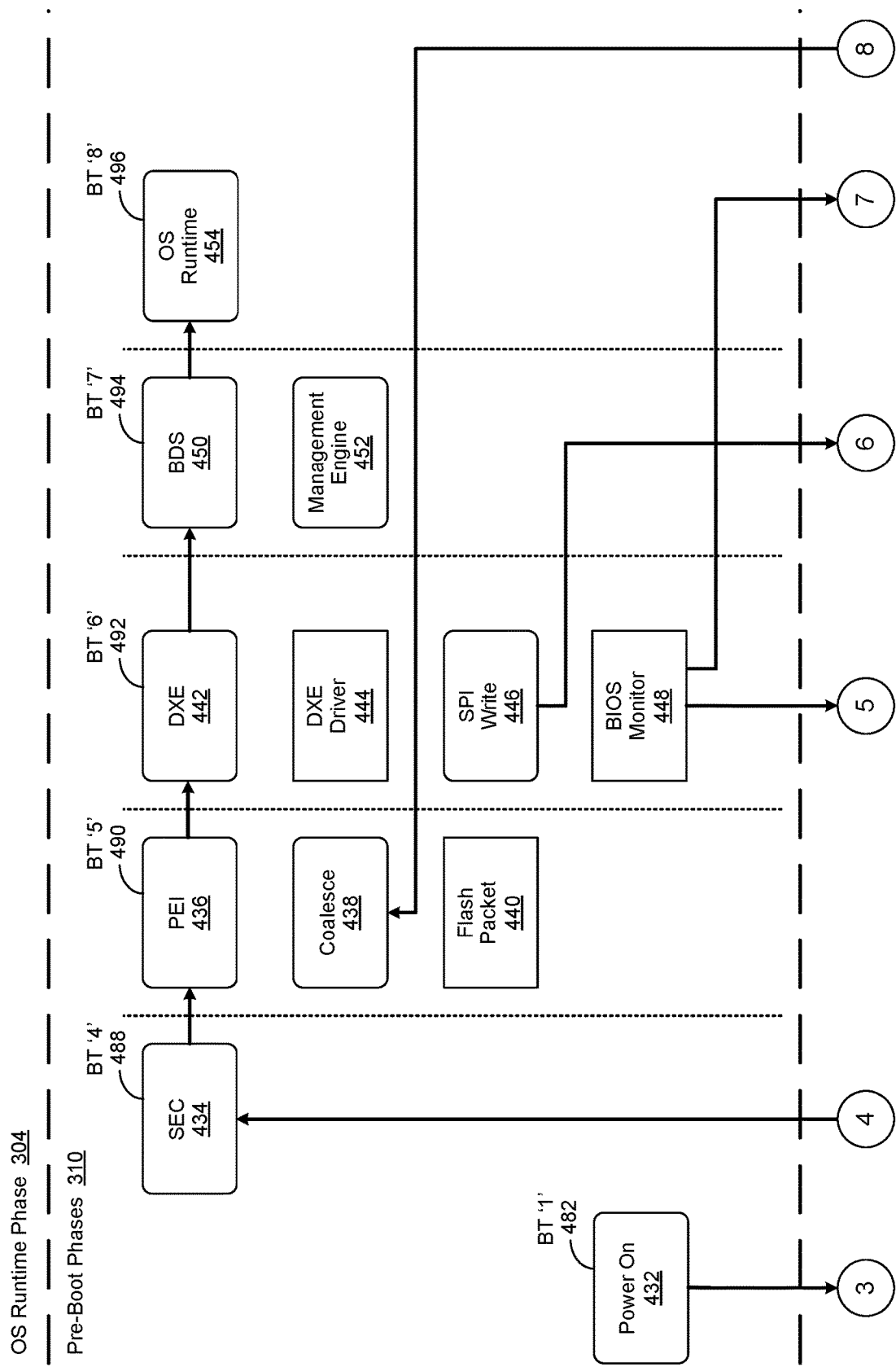
Figure 4C:
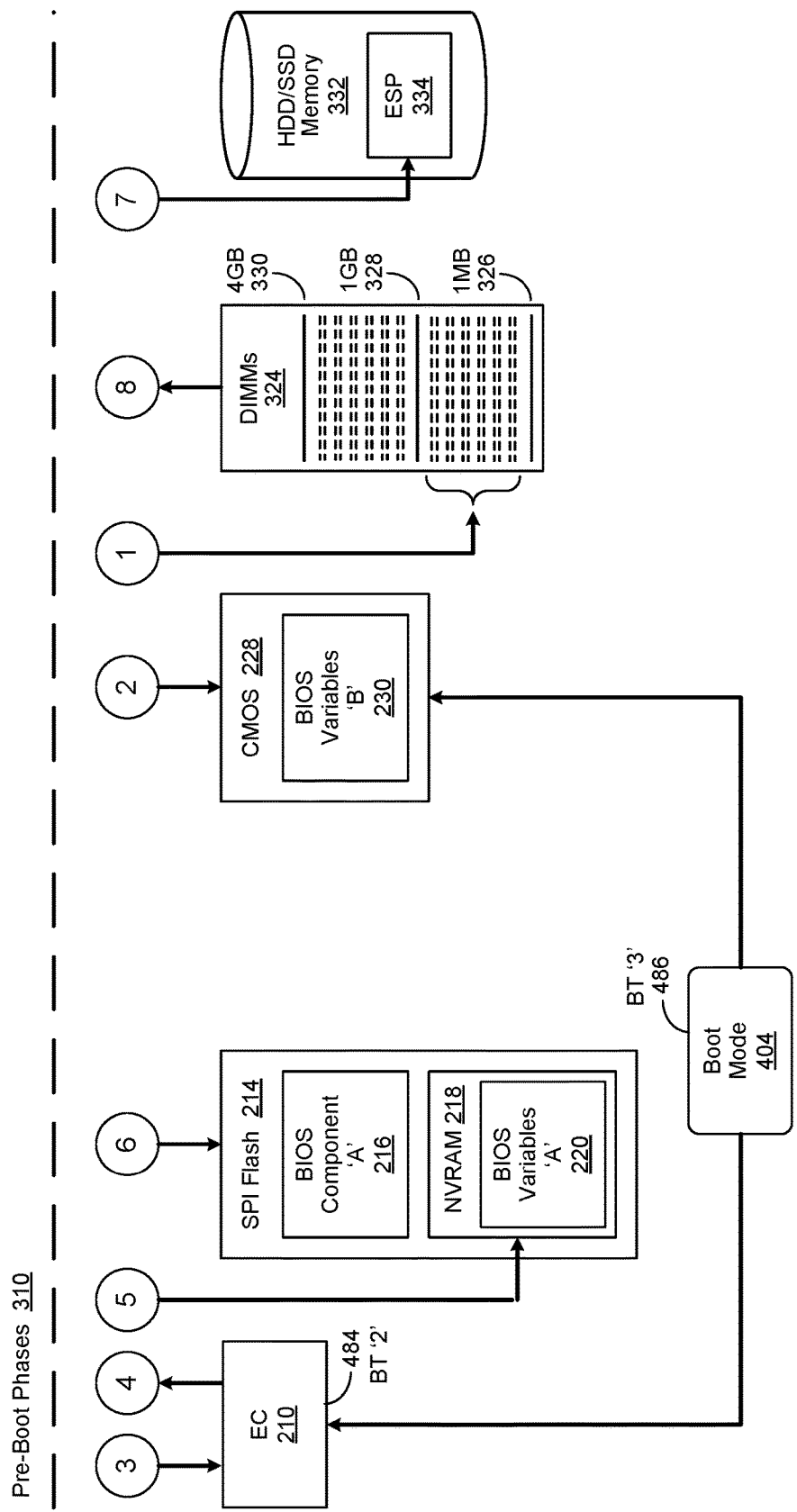

FIGS. 4a through 4c are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4a, a distributed firmware management operation may be initiated by the ASDFMP 300 receiving a BIOS.exe 412 file in runtime (RT) step '1'. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328. Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one of more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver eXecution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more Firmware Management Protocol (FMP) Drivers 444. In general, the DXE Core component is responsible for producing a set of boot services, DXE services, and RT Services. Likewise, the DXE Dispatcher component is responsible for discovering and executing FMP Drivers 444 in the correct order. In turn, the FMP Drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5A:
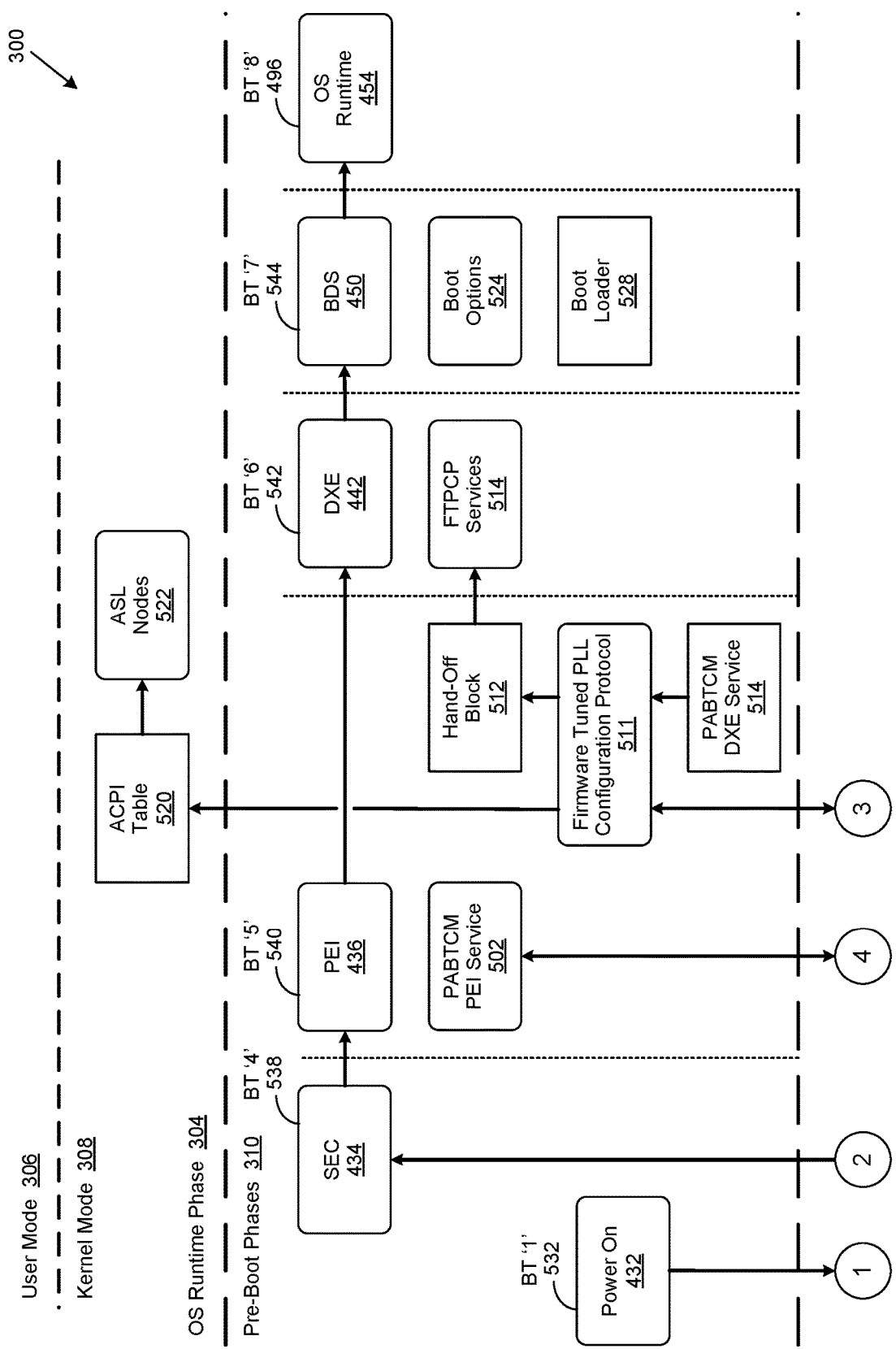
FIGS. 5a and 5b are a simplified block diagram showing the performance of processor environment agnostic basic input output system timing configuration management operations; and, FIG. 6 is a simplified block diagram showing processor environment agnostic BIOS timing configuration management operation operations.
Figure 5B:
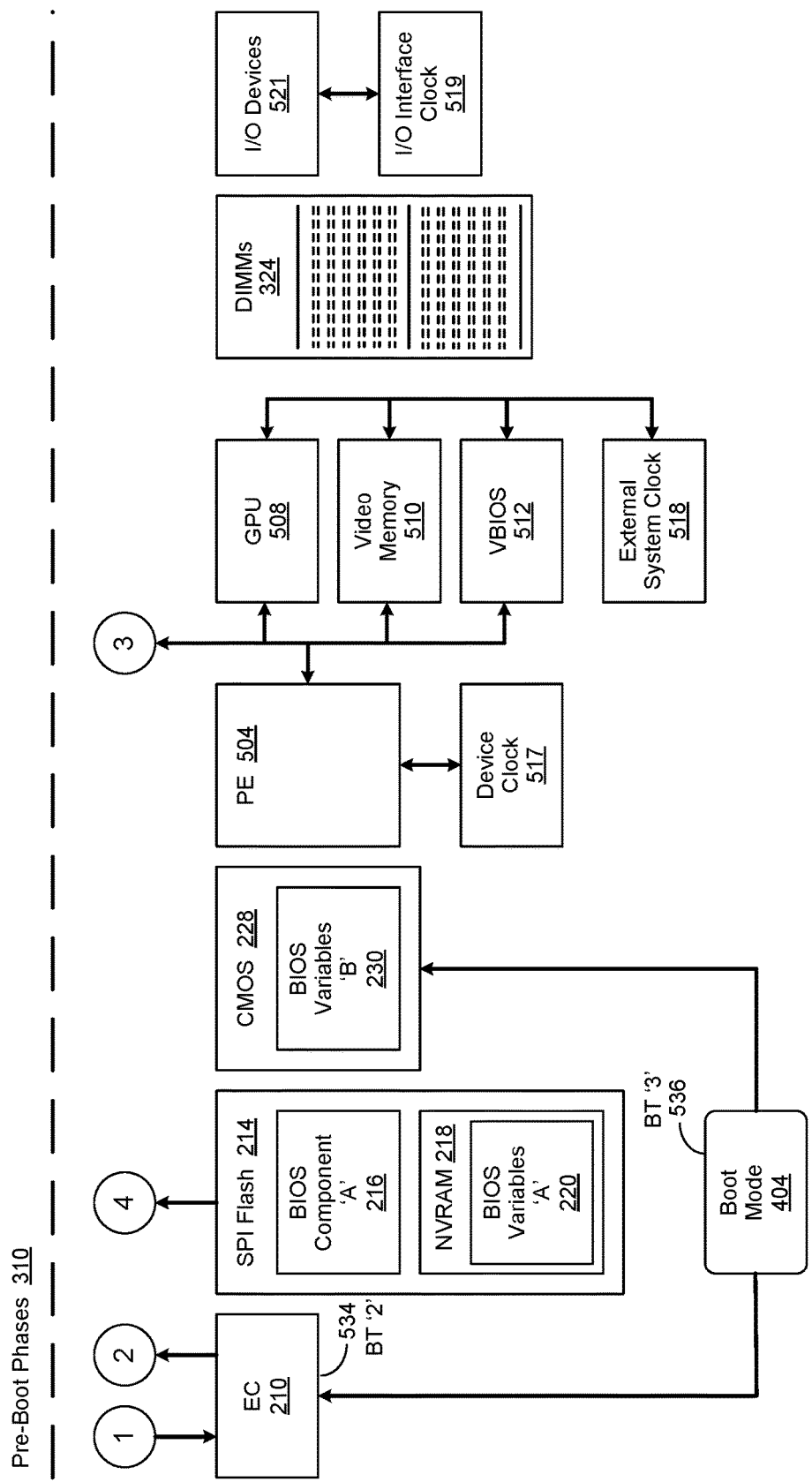

FIGS. 5a through 5c, show a simplified block diagram showing the performance of a processor environment agnostic BIOS timing configuration management operation 500. In certain embodiments, a firmware management operation includes the processor environment agnostic BIOS timing configuration management operation. As used herein, a processor environment agnostic BIOS timing configuration management operation broadly refers to any task, function, operation, procedure, or process performed, directly or indirectly, by a BIOS to tune, modify, revise, or update one or more clock signals of an information handling system, described in greater detail herein. In certain embodiments, the processor environment agnostic BIOS timing configuration management operation 500 includes a processor environment agnostic firmware tuned PLL configuration operation. As used herein, a processor environment agnostic firmware tuned PLL configuration operation broadly refers to any task, function, operation, procedure, or process performed, directly or indirectly, by an information handling system firmware to tune, modify, revise, or update one or more phase lock loop clock signals of an information handling system, described in greater detail herein.

In certain embodiments, the one or more clock signals perform a clocking function for components of the information handling system. As used herein, a clocking function broadly refers to any task, function, operation, procedure, or process performed, directly or indirectly, by information handling system firmware to ensure various components of the information handing system are synchronized to work together with the same timing. In various embodiments, the clocking function can include a processor environment focused clocking function, a memory system focused clocking function, other information handling system focused clocking function, or a combination thereof. It will be appreciated that ensuring the various components of the information handling system are synchronized can be challenging as some of all of these components may have their own associated clock signals. Accordingly, the processor environment agnostic firmware tuned PLL configuration operation facilitates this synchronization by ensuring the various associated clock signals are synchronized with one another.

In certain embodiments, the processor environment agnostic firmware tuned PLL configuration operation makes use of a firmware tuned PLL configuration protocol (FTPCP). In certain embodiments, during a device boot-up process, the firmware tuned PLL configuration operation reads processor environment specific timing characteristic information. In certain embodiments, the processor environment specific timing information includes processor environment specific PLL characteristic information. In certain embodiments, the processor environment specific PLL characteristic information includes System-on-Chip (SoC) specific PLL characteristic information. In certain embodiments, the firmware tuned PLL configuration operation queries the memory modules to fetch device specific timing information (e.g., memory characteristic timing information). In certain embodiments, the firmware tuned PLL configuration operation retrieves additional component timing information. In certain embodiments, the additional component timing information includes component vendor specific information.

In certain embodiments, the firmware tuned PLL configuration operation uses the processor environment specific timing information and the device specific timing information to determine an optimal PLL initialization configuration. In certain embodiments, the firmware tuned PLL configuration operation allows specifying a PLL output clock which feeds a clock network. In certain embodiments, the PLL output clock provides a compensation target for a PLL circuit. In certain embodiments, the firmware tuned PLL configuration operation can configure the PLL to function in a normal mode of operation, a source synchronous mode of operation, or a combination thereof. In certain embodiments, the firmware tuned PLL configuration operation configures the PLL circuit to match a PLL feedback path to a clock network of the information handling system. In certain embodiments, matching the PLL feedback path with the clock network impact the overall system performance, including processor environment performance, graphics processor unit performance, memory module performance, peripheral component performance or a combination thereof.

In certain embodiments, the firmware tuned PLL configuration operation determines when a memory module is replaced on the information handling system. When a memory module replacement is detected, firmware tuned PLL configuration operation dynamically detects the change in the hardware configuration of the information handling system during the boot-process and initiates a fetch operation to retrieve best known timing configuration information. In certain embodiments, the best known timing configuration information is retrieved from a cloud based storage location.

In certain embodiments, the cloud based storage location contains a plurality of timing configurations for the information handling system. In certain embodiments, the plurality of timing configurations support a plurality of processor environments as well as a plurality of memory module configurations. In certain embodiments, providing the plurality of timing configurations avoids frequent restarts on the information handing system for fine-tuning the clock module after the memory swap, thus avoiding an undesirable user-experience. Accordingly, the firmware tuned PLL configuration operation effectively manages memory upgrades or downgrades in a manner that is, independent of the particular processor environment and memory module configuration, thus ensuring efficient handling when such changes are made to the information handing system.

In certain embodiments, the firmware tuned PLL configuration operation pushes the protocol to the ACPI table. In certain embodiments, the firmware tuned PLL configuration operation pushes the timing information via the FTPCP to an advanced configuration and power interface (ACPI) table during a DXE phase. In certain embodiments, the firmware tuned PLL configuration operation includes an FTPCP service which executes in a DXE phase. In certain embodiments, by so pushing the timing information, the firmware tuned PLL configuration operation dynamically fine-tunes the timing attributes of the information handling system to ensure synchronization of all peripherals at operating system runtime, enabling precise data sampling and peripheral module initialization as well as subsequent operations. In certain embodiments, the protocol is available via unified extensible firmware interface such as an EDK2 firmware interface.

In certain embodiments, the firmware tuned PLL configuration operation includes security measures which execute during a PLL configuration operation. In certain embodiments, the security measures prevent malicious user interference in the PLL configuration process. In certain embodiments, the security measures are implemented to execute during a PLL configuration. In certain embodiments, the security measures include cloud-based security measures.

In certain embodiments, the firmware tuned PLL configuration operation includes a service routine tuning operation. In certain embodiments, the service routine tuning operation tunes an interrupt service routine (IRQ). In certain embodiments, the service routine tuning operation tunes the interrupt service routing for varied timing attributes thereby avoiding latency in interrupt services.

In certain embodiments, the firmware tuned PLL configuration operation optimizing configuration of the PLL module advantageously provides as reduced power consumption and improved frequency tuning, thus directly enhancing information handling system performance.

Referring now to FIGS. 5a, 5b and 5c, a processor environment agnostic BIOS timing configuration management, described in greater detail herein, may be initiated by the application of power 432 to the ASDFMP 300 in pre-boot time (BT) step '1' 532. The EC 210 is then invoked in BT step '2' 534 which results in the activation of a boot mode 404 in BT step '3' 536. In various embodiments, the boot mode 404 may be activated in BT step '3' 536 by retrieving, and using, certain BIOS variables 'A' 220 stored in a NVRAM 218 memory of a SPI Flash 218 memory, BIOS variables 'B' 230 stored in the CMOS 228 chip, or a combination thereof.

One or more security (SEC) 434 phase operations may then be performed in BT step '4' 538, followed by the performance of one or more PEI 436 phase operations in BT step '5' 540. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations. In various embodiments, the performance of one or more PEI 436 phase operations in BT step '5' 540 may include the performance or one or more processor agnostic BIOS timing configuration management operations, described in greater detail herein.

In certain of these embodiments, the one or more processor agnostic BIOS timing configuration management operations may be performed to initiate a processor agnostic BIOS timing configuration management PEI service 502. In various embodiments, the BBL PEI service 502, once initiated, may then be used to retrieve one or more PE BIOS components 516 from SPI Flash 214 memory. In certain embodiments, the PE BIOS components 516 include processor agnostic BIOS timing configuration management components 516, for the ASDFMP's 300 a processor environment 504, a memory module configuration 506, a graphics processing unit 508, video memory 510, video BIOS 512, or a combination thereof. In certain embodiments, the FTPCP services synchronize a device clock circuit 517, an external system clock circuit 518, an input/output interface clock circuit 519, or a combination thereof. In certain embodiments, the device clock circuit 517 includes a PLL clock circuit. In certain embodiments, a clock signal generated by the PLL clock circuit controls the external system clock circuit 518, the input/output interface clock circuit 519, or a combination thereof. In certain embodiments, the clock signal generated by the device clock circuit 517 is configured for a particular processing environment, a particular memory module configuration, or a combination thereof. In certain embodiments, the clock signal generated by the input/output interface clock circuit 519 is configured for one or more I/O devices 521.

In various embodiments, the processor agnostic BIOS timing configuration management PEI service 502 may likewise be implemented to initialize a processor agnostic BIOS timing configuration management PEI service protocol 502. In certain embodiments, the BIOS timing configuration management PEI service protocol 511 includes the FTPCP.

In certain embodiments, the BIOS timing configuration management PEI service protocol 511 process the retrieved one or more PE BIOS. In certain embodiments, the retrieved PE BIOS components include processor agnostic BIOS timing configuration management components which may be used by the FTPCP 511 to generate a processor agnostic BIOS timing configuration management PEI Hand-Off Block (HOB) 512. Those of skill in the art will be familiar with an HOB 512, which as typically implemented, allows the PEI phase 436 to pass certain information to the DXE 438 phase. Various embodiments of the invention reflect an appreciation that HOBs 512 are position independent and can be easily relocated to different memory locations. Accordingly, they are well suited for use in various distributed firmware management operations.

In various embodiments, the performance of one or more DXE 442 phase operations in BT step '6' 542 may likewise include the performance of processor agnostic BIOS timing configuration management operations. In certain of these embodiments, the one or more processor agnostic BIOS timing configuration management operations may be performed to initiate a processor agnostic BIOS timing configuration management DXE service 514. In various embodiments, the processor agnostic BIOS timing configuration management operations 514, once initiated, may then be used to receive a processor agnostic BIOS timing configuration management PEI Hand-Off Block 512 from the PEI phase 436.

In various embodiments, the processor agnostic BIOS timing configuration management DXE service 512 may likewise by implemented to retrieve one or more PE BIOS components 516, described in greater detail herein. In certain embodiments, the one or more PE BIOS components 516 include PE specific timing components. In certain embodiments, the one or more timing components 516 are retrieved from an ACPI table 520 (see e.g., FIG. 5a). In certain embodiments, the ACPI table 520 interacts with one or more ACPI source language (ASL) nodes 522 to identify the one or more timing components 516. In certain embodiments, each ASL node 522 corresponds to an information handling system component and the firmware associated with the information handling system component. In certain embodiments, the ACPI table 520 stores one or more PLL tuning server entries, a reset vector entry, an apply attributed entry, or a combination thereof.

In various embodiments, the processor agnostic BIOS timing configuration management DXE service 512 may likewise be implemented to initialize the retrieved other platform BIOS components 526. In various embodiments, the processor agnostic BIOS timing configuration management DXE service 512 may be likewise be implemented in BT step '6' 542 to provide the initialized BIOS components 526 to a boot device selection (BDS) 450 phase. In various embodiments, one or more BDS 450 phase operations may then be performed in BT step '7' 544 to select certain boot options 524, which may in turn be used in combination with the previously received and initialized timing components 516 by a particular boot loader 528 to boot the ASDFMP 300 into an OS runtime state.

Figure 6:
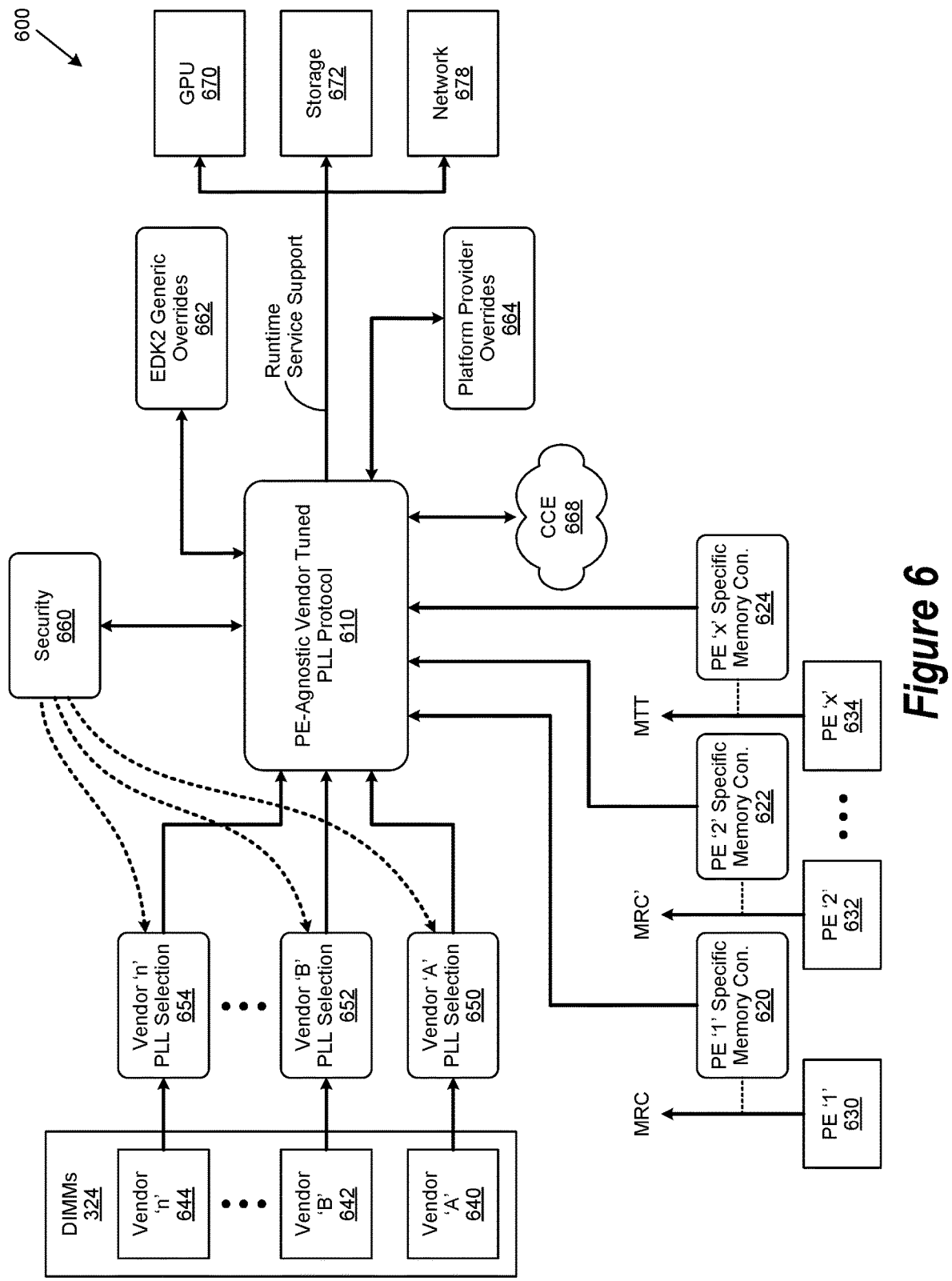

Referring now to FIGS. 6a and 6b, a processor environment agnostic BIOS timing configuration management operation 600 is shown. In certain embodiments, the processor environment agnostic BIOS timing configuration management operation 600 executes a processor environment agnostic BIOS timing configuration management system 610. In certain embodiments, the processor environment agnostic BIOS timing configuration management system 610 includes a firmware tuned PLL configuration protocol (FTPCP).

In certain embodiments, during a device boot-up process, the firmware tuned PLL configuration operation reads processor environment specific timing characteristic information 620, 622, 624. In certain embodiments, the processor environment specific timing characteristic information 620, 622, 624 corresponds to a respective processor environment 630, 632, 634. In certain embodiments, the respective processor environments 630, 634, 634 comprise respective system-on-chips. In certain embodiments, the processor environment specific timing information 620, 622, 624 includes processor environment specific PLL characteristic information (MRC, MRC', MTT) for a respective processor environment. In certain embodiments, the processor environment specific PLL characteristic information includes System-on-Chip (SoC) specific PLL characteristic information.

In certain embodiments, the firmware tuned PLL configuration operation queries one or more memory modules 640, 642, 644 to fetch memory characteristic timing attributes 650, 652, 654. In certain embodiments, a security operation 660 is applied when retrieving the memory characteristic timing attributes 650, 652, 654.

In certain embodiments, the firmware tuned PLL configuration operation retrieves additional component timing information. In certain embodiments, the additional component timing information includes component vendor specific information. In certain embodiments, the protocol interacts with a unified extensible firmware interface such as an EDK2 firmware interface. In certain embodiments, the unified extensible firmware interface 662 provides timing overrides to the processor environment agnostic BIOS timing configuration management system 610. In certain embodiments, an information handling system platform provider 664 can provide timing overrides to the processor environment agnostic BIOS timing configuration management system 610. In certain embodiments, timing information can be stored in a remote repository 668 such as a cloud repository.

In certain embodiments, the processor environment agnostic BIOS timing configuration management system 610 can generate a processor environment agnostic BIOS timing configuration management service. In certain embodiments, the processor environment agnostic BIOS timing configuration management service can provide timing management of one or more information handling system components. In certain embodiments, the one or more information handling system components can include a graphics processing unit 670, a storage device 672, a network device 678, or a combination thereof.

The processor environment agnostic BIOS timing configuration management operation can facilitate operation of an information handing system in a plurality of different use cases. For example, the processor environment agnostic BIOS timing configuration management operation is useful in a use case where PLL tuning is performed and the version number (e.g., a machine readable version number of the processor environment (irev)) has been reset for a tuning of the specific information handing system configuration has been reset based upon the PLL tuning. In one example, the PLL tuning might involve changing the processor environment throttling settings from a lower frequency (2.8 GHz) to a higher frequency (3.4 GHz). Such a change in the throttling settings can result in an approximate 4% increase in processor throttling. However, when the processor operates at a higher frequency, it becomes even more important to synchronize the entire information handling system platform ecosystem accordingly. Accordingly, the processor environment agnostic BIOS timing configuration management operation provides an intelligent and adaptive tuning system which dynamically modifies the PLL attributes for the entire information handling system platform.

Additionally, because many known memory subsystems are only responsive to lower frequencies, leading to decreased performance it would be desirable to provide a means for increasing PLL frequency which translates to the memory subsystems. To address this issue, the processor environment agnostic BIOS timing configuration management operation provides tailored attribute tuning for the memory subsystem, GPU subsystems, and peripheral devices within the new best known configuration. Without a FTPCP, achieving the desired platform ecosystem tuning to the higher processor environment frequency can require multiple boot attempts, potentially causing abrupt system behavior, including system crashes.

The processor environment agnostic BIOS timing configuration management operation provides concurrent maintenance of processor throttling by broadcasting tuning policies after a single reboot. Subsequently, the tuning protocol dynamically monitors and adjusts the platform ecosystem to accommodate the new processor frequency. This approach eliminates the need for multiple reboots and replaces them with a single reboot, reducing the risk of infinite reboot loops.

Additionally, in another use case, a need to adjust memory frequency attributes dynamically can be present due to a timing based error in the system. More specifically, adjusting the processor environment timing could cause a memory subsystem timing based error. For example, if the processor environment timing is adjusted from 2.8 GHz to 3.2 GHz could lead to DMA controller failures as there would be no way to monitor and communicate the processor frequency change to the memory systems. Accordingly, the processor environment agnostic BIOS timing configuration management operation provides a firmware based approach which monitors and communicates the adjusted processor timing to other components of the information handling system ecosystem such as the memory subsystems.

Additionally, in another use case, often an integrated GPU (iGPU) isn't optimized by the operating system to synchronize with the timing of the processor environment, possibly leading to excessive workload requirements being placed on a discrete GPU (dGPU), which can lead to overheating issues. Accordingly, in certain embodiments, the processor environment agnostic BIOS timing configuration management operation, the FTPCP, or a combination thereof, provides comprehensive tuning across the iGPU, the dGPU, or a combination thereof to provide enhanced GPU performance while ensuring power and thermal efficiency.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:
   providing an information handling system with a distributed BIOS, the distributed BIOS including a BIOS component and a BIOS variable;
   identifying a processor environment installed on an information handling system from a plurality of processor environments; and,
   tuning a clock signal within the information handling system based upon the processor environment installed on the information handling system, the tuning being performed during a pre-boot phase of the distributed BIOS; and wherein
   the clock signal includes a memory device clock signal, the memory device clock signal providing a clocking function for a memory device installed on the information handling system.

2. The method of claim 1, wherein:
   the clock signal includes a phase locked loop clock signal.

3. The method of claim 1, wherein:
   the clock signal includes a processor environment device clock signal, the processor environment device clock signal providing a clocking function for the processor environment.

4. The method of claim 3, wherein:
   the processor environment includes associated processor environment specific timing attributes; and,
   the processor environment device clock signal is tuned based upon the associated processor environment specific timing attributes.

5. The method of claim 1, wherein:
   the memory device includes associated memory device specific timing attributes; and,
   the memory device clock signal is tuned based upon the associated memory device specific timing attributes.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   providing an information handling system with a distributed BIOS, the distributed BIOS including a BIOS component and a BIOS variable;
   identifying a processor environment installed on an information handling system from a plurality of processor environments; and,
   tuning a clock signal within the information handling system based upon the processor environment installed on the information handling system, the tuning being performed during a pre-boot phase of the distributed BIOS; and wherein
   the clock signal includes a memory device clock signal, the memory device clock signal providing a clocking function for a memory device installed on the information handling system.

7. The system of claim 6, wherein:
   the clock signal includes a phase locked loop clock signal.

8. The system of claim 6, wherein:
   the clock signal includes a processor environment device clock signal, the processor environment device clock signal providing a clocking function for the processor environment.

9. The system of claim 8, wherein:
   the processor environment includes associated processor environment specific timing attributes; and,
   the processor environment device clock signal is tuned based upon the associated processor environment specific timing attributes.

10. The system of claim 6, wherein:
    the memory device includes associated memory device specific timing attributes; and,
    the memory device clock signal is tuned based upon the associated memory device specific timing attributes.

11. A non-transitory, computer-readable storage medium embodying computer program code, the computer program code comprising computer executable instructions configured for:
    providing an information handling system with a distributed BIOS, the distributed BIOS including a BIOS component and a BIOS variable;
    identifying a processor environment installed on an information handling system from a plurality of processor environments; and,
    tuning a clock within the information handling system based upon the processor environment installed on the information handling system, the tuning being performed during a pre-boot phase of the distributed BIOS; and wherein
    the clock signal includes a memory device clock signal, the memory device clock signal providing a clocking function for a memory device installed on the information handling system.

12. The non-transitory, computer-readable storage medium of claim 11, wherein:
    the clock signal includes a phase locked loop clock signal.

13. The non-transitory, computer-readable storage medium of claim 11, wherein:
    the clock signal includes a processor environment device clock signal, the processor environment device clock signal providing a clocking function for the processor environment.

14. The non-transitory, computer-readable storage medium of claim 13, wherein:

the processor environment includes associated processor environment specific timing attributes; and, the processor environment device clock signal is tuned based upon the associated processor environment specific timing attributes.

15. The non-transitory, computer-readable storage medium of claim 11, wherein:
the memory device includes associated memory device specific timing attributes; and,
the memory device clock signal is tuned based upon the associated memory device specific timing attributes.

16. The non-transitory, computer-readable storage medium of claim 11, wherein:
the computer executable instructions are deployable to a client system from a server system at a remote location.

17. The non-transitory, computer-readable storage medium of claim 11, wherein:
the computer executable instructions are provided by a service provider to a user on an on-demand basis.

* * * * *